June 17, 1924.
J. L. HULBERT
1,497,854
MILKING MACHINE
Filed July 20, 1922 4 Sheets-Sheet 1
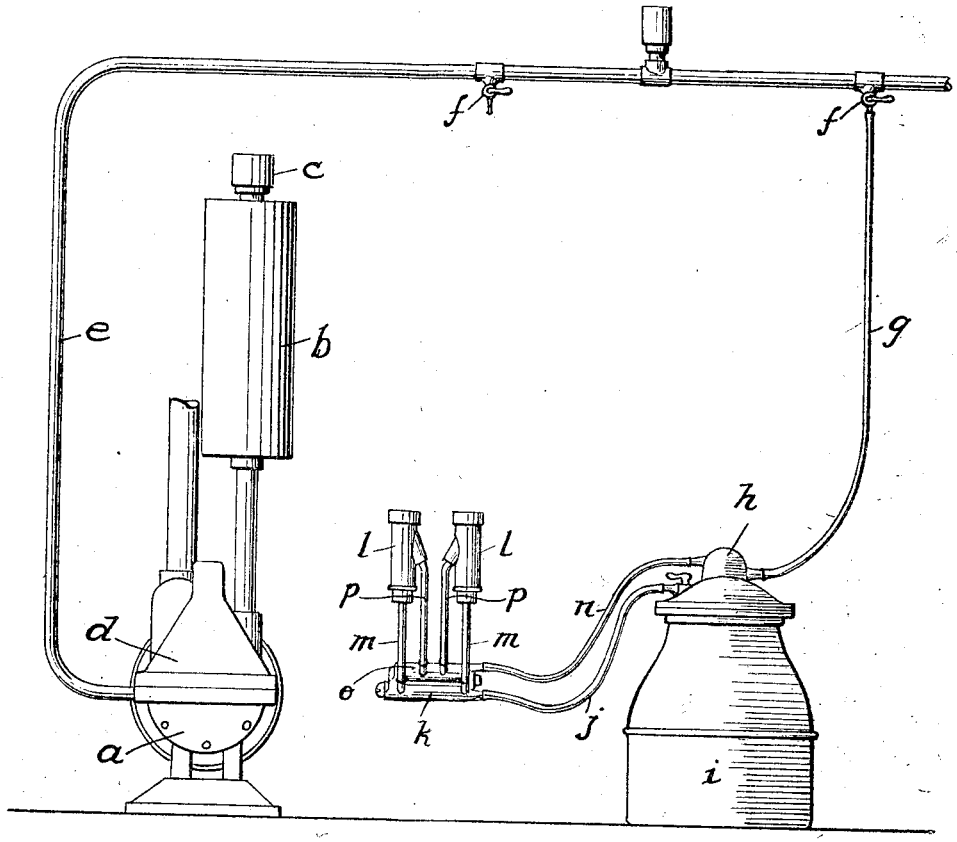
FIG.1.
FIG.2.
WITNESS:
INVENTOR
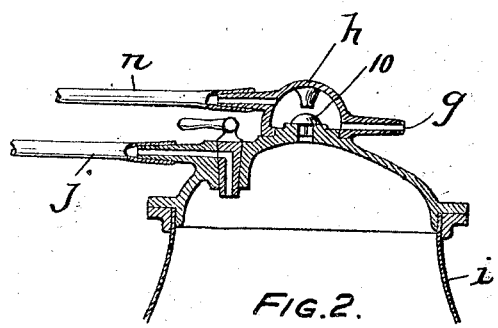
John L. Hulbert
BY
Frank S Busser
ATTORNEY June 17, 1924.

J. L. HULBERT

MILKING MACHINE

Filed July 20, 1922

WITNESS:

INVENTOR

John L. Hulbert

BY

Frank S. Busser

ATTORNEY

June 17, 1924.
J. L. HULBERT
MILKING MACHINE
Filed July 20, 1922    4 Sheets-Sheet 3
1,497,854
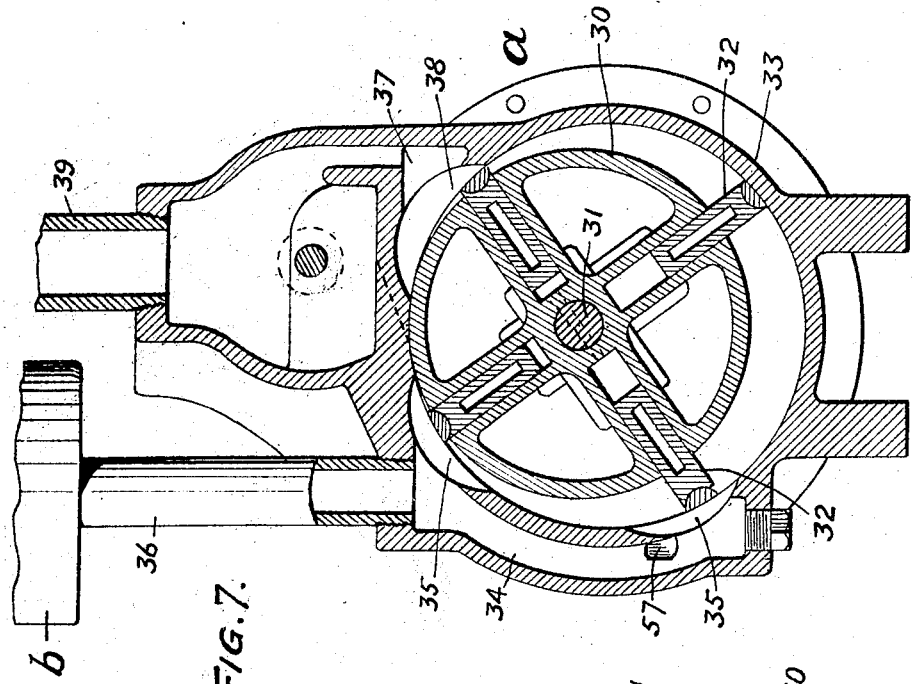
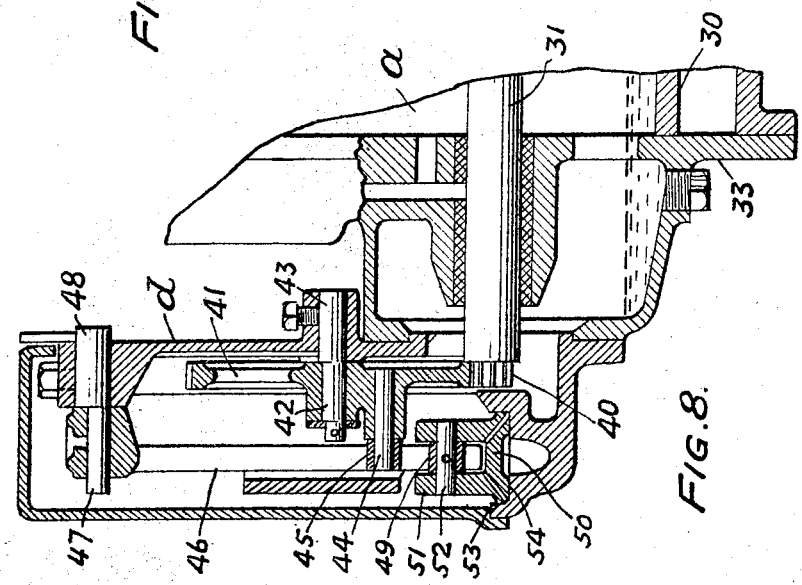
WITNESS:
INVENTOR
John L. Hulbert
BY
ATTORNEY June 17, 1924. 1,497,854

J. L. HULBERT

MILKING MACHINE

Filed July 20, 1922    4 Sheets-Sheet 4

WITNESS:
Rob't R Kitchel

INVENTOR
John L. Hulbert
BY
Frank S. Busser
ATTORNEY.

Patented June 17, 1924.

1,497,854

UNITED STATES PATENT OFFICE.

JOHN L. HULBERT, OF POUGHKEEPSIE, NEW YORK, ASSIGNOR TO THE DE LAVAL SEPARATOR COMPANY, OF NEW YORK, N. Y., A CORPORATION OF NEW JERSEY.

MILKING MACHINE.

Application filed July 20, 1922. Serial No. 576,212.

*To all whom it may concern:*

Be it known that I, JOHN L. HULBERT, a citizen of the United States, residing at Poughkeepsie, county of Dutchess, and State of New York, have invented a new and useful Improvement in Milking Machines, of which the following is a full, clear, and exact description, reference being had to the accompanying drawings, which form a part of this specification.

My invention is an improvement in milking machines and, though not limited in its application to any specific type of machine, is particularly applicable to those types having teat cups with a central teat receiving chamber, adapted for connection with a source of suction, separated by a flexible liner from an annular inflation chamber adapted to be connected alternately with the source of suction and the atmosphere, thereby producing pulsations which cause a flow of milk.

Of these types of machines, that wherein the pneumatic pulsations are produced by a master pulsator located at the end of a pulsation pipe line has given the most satisfactory results. A second pipe line, connected with a vacuum pump, connects with the milk pail and with the inner, or milk, or teat receiving, chambers of the teat cups. The pneumatic pulsations in the pulsation pipe line operate, or control the operation of, a secondary or relay pulsator valve mounted either on the milk pail or (preferably) on a claw close to the teat cups and which, in its reciprocations, connects the inflation chambers alternately with vacuum and atmosphere, one pair being connected with vacuum while the other is connected with atmosphere. A good example of such a system is disclosed in the patent to Forsyth, No. 1,257,688, dated February 26, 1918. This system, while very successful, is not without substantial shortcomings. The first cost of installing two pipe lines is high. Due to the large vacuum pump required to cause, in the pipe line, pulsations of sufficient amplitude to operate the secondary pulsator, the cost of operation is high.

It is known, however, to provide a single pipe line operable by a master pulsator to exhaust air from the pail and from the milk chambers of the teat cups and to create pneumatic pulsations in the inflation chambers of the teat cups. Such a system is disclosed in the Leitch Patent No. 1,163,161, dated December 7, 1915. The utilization, in such a system, of a secondary or relay pulsator valve that is operable by the pulsations in the single pulsation pipe line to produce pulsations in the inflation chambers of the teat cups has also been patented. See, for example, the Leitch Patent No. 1,196,001, dated August 29, 1916. This patent also discloses means whereby, in the operation of the secondary valve, pulsations are created in the inflation chambers of two pairs of teat cups alternately.

In both the single pipe system and the double pipe system, the secondary pulsator is moved in one direction by a pressure wave in the pulsation pipe line and in the opposite direction by a suction wave, and though these waves (e. g., atmosphere and partial vacuum) may be of exactly the same length as the master valve, they soon become of unequal lengths as they pass through the pulsation pipe. This causes unequal timing of the secondary pulsator and consequent unequal suction in the two pairs of teat cups.

In the two pipe system, this has been remedied by so constructing the secondary pulsator as to provide a substantial sized air chamber in communication with the end of the secondary valve cylinder opposite to that in communication with the pulsation pipe line and a constantly open restricted passage between the pulsation pipe line and the air chamber so as to maintain therein a pressure at a value half way between the extremes of the pulsations, as set forth in the application of Selden H. Hall, Serial No. 446,037, filed February 18, 1921. In the single pipe system, the same difficulty has been remedied by a construction wherein the secondary pulsator is moved by waves of one strength in the pulsation pipe line and held stationary by waves of different strength, thus causing pulsations in the teat cups of half the frequency of those in the pulsation pipe line; as set forth in a patent issued to me February 21, 1922, No. 1,407,034. In the milker of this patent, however, the secondary pulsator mechanism comprises two chambers, three check valves and two tanks and is so relatively cumbersome that it cannot well be placed in the claw.

In all of these systems, the difficulty arises of propagating the pneumatic wave through a pipe line so that it will not flatten out more or less and become ineffective to operate a valve.

The object of the present invention is to provide means, especially applicable to the single pipe system, which will have all the advantages of known patented systems, including equal timing of the secondary pulsator and consequent equal action in the two pairs of teat cups of alternating machines, and will also have an advantage peculiar to itself, namely: the propagation of a pneumatic wave through a considerable length of pipe line without flattening out, so as to insure the proper operation of a secondary pulsator (or a relay, if relays be used) located at a substantial distance from the point of origin of the pneumatic wave. This particular result is accomplished by the expedient of subjecting the pipe line, during most of the time, to suction, with a momentary admission of air, at regular intervals of time; and specifically, to normally maintain in the pipe line a pressure about half that of atmospheric and impressing thereon, at regular intervals, short higher pressure waves, say by connecting the pipe with atmosphere: thereby producing a wave that travels along the pipe in tidal wave fashion, producing throughout the pipe a sharp action to which a valve may be made to respond. The old action of alternating high pressure and low pressure waves of equal duration might be likened to the action upon the distant end of a long tight rope whose near end is regularly moved back and forth by a crank; while the action of the present invention may be likened to the action of the distant end of the same rope when its near end is struck a quick, sharp blow. In one case the distant end of the rope would have little movement, while in the other case the distant end of the rope would have a sharp action.

By reason of this action, it is possible to provide a relatively light and simple type of secondary pulsator and to locate the pulsator in the claw, which, of the known locations, has been found to be the best because of its close proximity to the teat cups.

I accomplish this result by means of a construction that is capable of different specific embodiments, several of which are illustrated in the accompanying drawings and hereinafter described.

Fig. 1 is a diagrammatic representation of a complete installation.

Fig. 2 is a detail view, in vertical section, showing the connections of the pipes to the milk pail.

Fig. 7 is a vertical sectional view through the vacuum pump.

Fig. 8 is a vertical sectional view through the master pulsator and the mechanism for driving it from the pump shaft.

Figure 3:
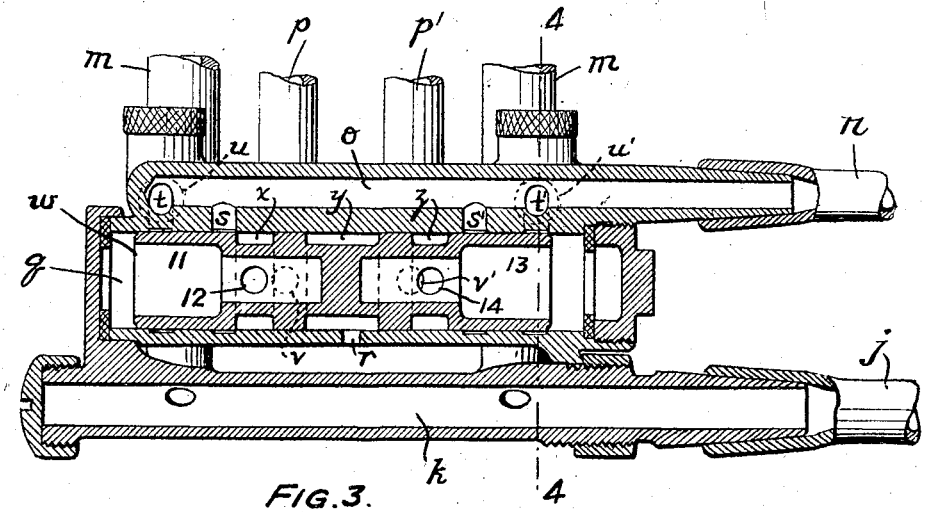
Fig. 3 is a longitudinal section of a preferred form of claw or cluster for use in my system.
Figure 4:
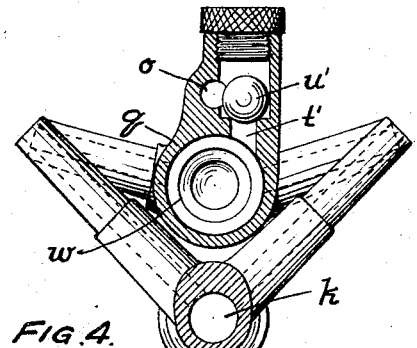
Fig. 4 is a cross-section on the line 4—4 of Fig. 3.

Referring first to the construction shown in Figs. 1, 2, 3 and 4: A pump $a$ is adapted to exhaust air from a tank $b$, to which a valve $c$ admits air whenever the pressure in tank $b$ drops below a predetermined value. A valve $d$, in this case gear-driven from the pump $a$, is adapted to maintain communication between the tank $b$ and a pulsation pipe line $e$ during most of the time so as to establish a normal absolute pressure in the pipe line of about half of atmospheric, but, during a very short time in each cycle, to cut off such communication and connect the pipe line with the atmosphere. A pump and valve structure adaptable to my invention is set forth in the Leitch Patent No. 1,378,881, dated May 24, 1921, the valve shown in Fig. 2 of that patent being adjusted to connect the pulsation pipe with atmosphere for a relatively short time.

On the pipe line $e$ are cocks $f$ adapted for the connection of flexible pipes $g$ leading from a casing (or passage) $h$ on the top of a milk pail $i$. This casing has an opening communicating with the milk-pail. This opening is controlled by means of a non-return valve 10, which freely opens to exhaust air from the pail but prevents the admission of air into the pail. This preferred construction is fully set forth in the Leitch Patent No. 1,394,433, dated October 18, 1921. A flexible pipe $j$ leads from the pail to one member $k$ (the milk chamber or passage) of a claw or cluster. This member is connected with the teat chambers of the four teat cups $l$ (only two are shown) by short flexible pipes $m, m$. A branch pipe $n$ connects the casing $h$ on the top of the pail with another member $o$ (the pulsation passage or pipe) of the claw or cluster.

Included also in the claw or cluster is a valve cylinder $q$ with an air inlet port $r$, two constantly open ports $s$ and $s'$ communicating with the pipe $o$, two ports $t$ and $t'$ communicating through check valves $u$ and $u'$ with the same pipe, and ports $v$ and $v'$ communicating with short flexible pipes $p$ and $p'$ leading to the inflation chambers of the respective pairs of teat cups. Reciprocable in the cylinder $q$ is a piston $w$ having three annular grooves $x$, $y$ and $z$. The groove $y$ is in constant communication with the air port r. One end of the piston has a hollow 11 in communication by a port 12 with the groove x. The other end of the piston has a hollow 13 in communication by a port 14 with the groove z.

With the piston w at the left end of its stroke (somewhat to the left of the position shown in Fig. 3) air is admitted through the port r, the groove y and port v to the pipes p and the inflators of the cups l connected therewith. At the same time air is exhausted through pipes p', port v', groove z, port 14, hollow end 13, port t' and check valve u', to the pipes o, n and g. When a higher pressure impulse comes through these last named pipes, it enters, through port s, the groove x, the port 12 and the hollow end 11, and raises the pressure in the left end of the cylinder q until it starts the piston w toward the right. In the position shown in Fig. 3, the piston has moved toward the right until it has closed port s and is opening port v, so that air, stored at atmospheric pressure in the inflator connected with the pipe p, can escape through port v, groove x, port 12, and hollow end 11 and further raise the pressure in the left end of the cylinder and cause the piston to complete its stroke and expose the port t, through which and the valve u the air can escape to the pipe o; the higher pressure impulse having been cut off before the completion of the stroke of the valve. The check valve u offers a slight resistance to the flow of air from the inflation chambers connected to the flexible pipes p and so prevents, in the pipe o, a sudden rise of pressure that might otherwise enter through port s' and cause a premature reverse movement of the piston.

With the piston at the right hand end of its stroke, air can enter through port r, groove y, port v' and pass through pipes p' to the inflation chambers of the cups l. The next higher pressure impulse through the pipes g, n and o will enter port s', groove z, port 14 and hollow end 13 and raise the pressure in the right end of the cylinder until it starts the piston toward the left. Before the piston reaches half stroke it will close port s' and open port v', so as to permit the air previously stored in the inflation chambers connected with the pipe p' to enter the right end of the cylinder and compel the piston to complete its stroke, during which the higher pressure impulse is cut off. The piston is now in its original position, the next cycle beginning at the next higher pressure impulse.

It may be seen that the movement of the piston in one direction is caused by the same condition in the pipe line that causes the movement in the other direction, so that the time for one half-cycle will be the same as that for the other half-cycle and the actions on the two pairs of teats will be equal.

Figures 5, 6:
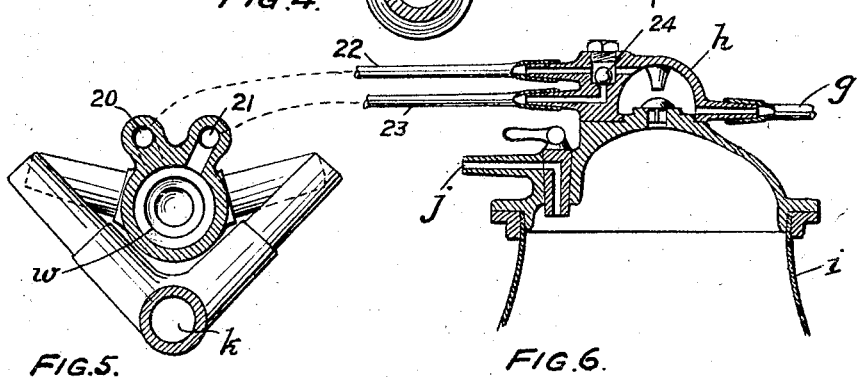
Fig. 5 is a cross-section, similar to Fig. 4, of a modified cluster construction.
Fig. 6 is a view, similar to Fig. 2, but modified to adapt said modified construction to the form of cluster shown in Fig. 5.

Instead of providing a single pipe or passage o in the claw or cluster with the ports s, s', t and t', and controlling the latter by means of check valves u and u', I may substitute two pipes or passages 20 and 21 (see Fig. 5). Ports corresponding to ports s and s' connect the valve cylinder with passage 20 and ports corresponding to ports t and t' (but without check valves) connect the valve cylinder with passage 21. Passage 20 is connected, through a pipe 22, with the casing h on the top of the milk pail and is in constant communication with pipe g and the pulsation pipe line e. Passage 21 is connected, through a pipe 23, with the pipe 22; a check valve 24 preventing the transmission of pressure impulses through pipe 23 and passage 21 but opening under the influence of the vacuum wave. The construction is otherwise the same as that of Figs. 1–4, and the mode of operation is essentially the same.

I have hereinbefore stated that the pump and valve structure set forth in the Leitch Patent No. 1,378,881, dated May 24, 1921, is adaptable, by adjustment of the primary pneumatic pulsator valve shown in Fig. 2 of that patent, to produce the relatively long suction waves and the relatively short pressure impulses whereby I insure the proper operation of a secondary pulsator located a substantial distance from the point of origin of the pneumatic wave. Such details of the pump and master pneumatic pulsator as are necessary to an understanding of the mode of operation of the present invention are shown in Figs. 7 to 11 inclusive.

The pump a comprises (among other details unnecessary to illustrate) the rotor 30 mounted on the driving shaft 31 and contains four slots in which vanes or wings 32 slide toward and from the shaft. The outer ends of these vanes have a sliding contact with the inner wall of a housing 33. At one side of the housing is an inlet chamber 34 connected with the bore of the housing by ports 35, 35. The inlet chamber 34 is connected, by means of a pipe 36, with the tank b. At the other side of the housing is an outlet chamber 37 connected with the bore by a port 38. The outlet chamber 37 is in communication with an exhaust pipe 39 open to atmosphere.

The pump shaft 31 carries a pinion 40 which drives a gear 41. Gear 41 revolves about a bearing 42 eccentrically formed on a shank 43 secured to the body d of the master pulsator. Gear 41 carries a crank pin 44 on which is a block 45 adapted, as the crank revolves, to slide up and down in a slotted pendulum 46. The pendulum is oscillatable about a pivot 47 eccentric to a pivot pin 48 secured to the pulsator body. In the lower part of the pendulum slot fits a block 49, which is carried on a pin 52 in ears 51 on top of a valve 50 reciprocable between guides 53 on the valve seat 54. In the seat 54 is a pulsation port 55 and a vacuum port 56. The latter communicates by a passage 57 with the vacuum chamber 34 of the pump. The pulsation port 55 is connected with the pulsation pipe line e.

Figure 9:
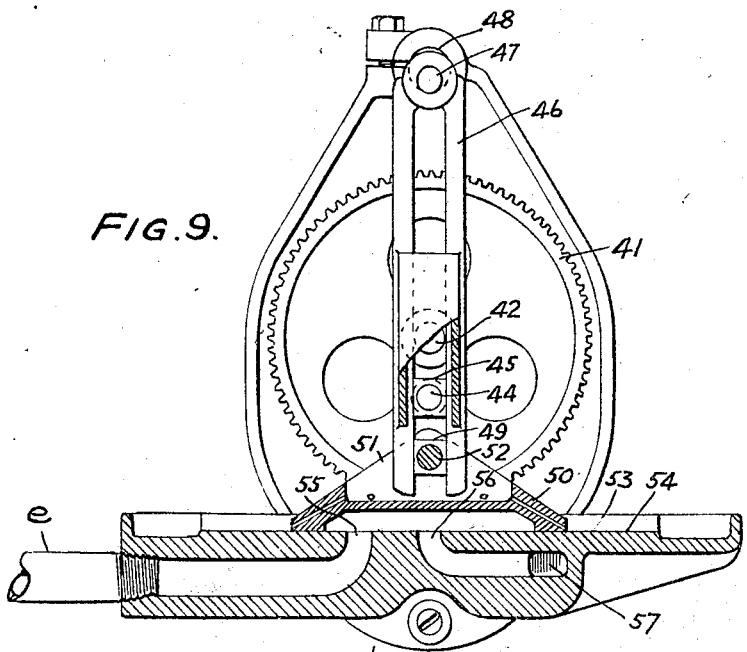
Fig. 9 is an enlarged sectional view of the master pulsator on the line 9—9 of Fig. 8.
Figure 10:
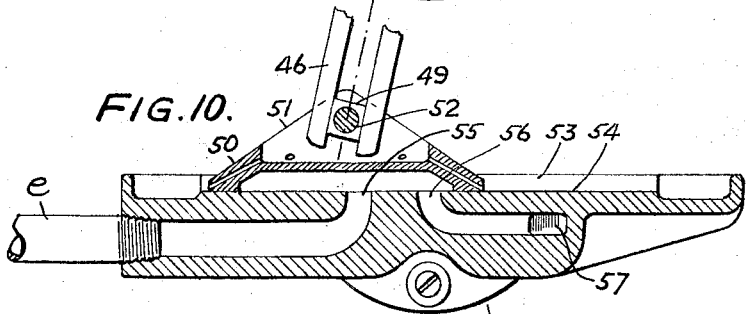
Figs. 10 and 11 are diagrams showing the master pulsator valve at its two extreme positions.
Figure 11:
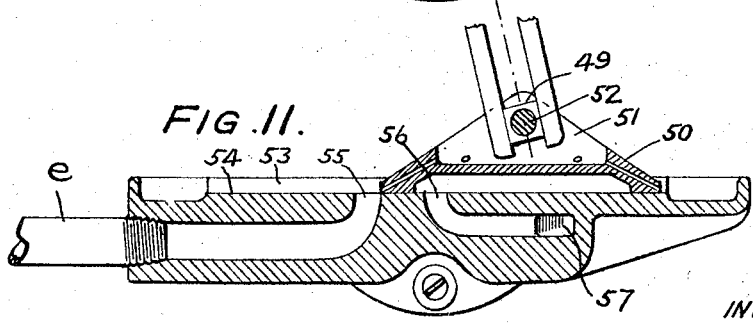

When the pump a is in operation, it oscillates the valve 50 through the medium of pinion 40, gear 41, crank 44, block 45 and slotted pendulum 46. In Fig. 9 the valve 50 is shown in the middle of its stroke, at which position the pulsation pipe line e is connected, through port 55, the valve cavity, the port 56 and passage 57, with the vacuum chamber 34 of the pump and the vacuum tank b. The construction is such that during the travel of the valve 50 to the extreme left of its median position (see Fig. 10) and back again to its median position and also for the major part of its stroke toward the extreme right of its median position (see Fig. 11), pipe line e remains connected with suction. As the valve approaches the extreme right hand end of its stroke, the valve 50 first covers the port 55 and then, as it completes its stroke, opens the port 55 to atmosphere. On the return stroke of the valve, a short movement covers the port 55 and then uncovers it to connect it with suction, the port 55 remaining connected with suction until the valve completes its stroke to the right and during the larger part of its return stroke to the left, as above described.

By this valve construction, it will be readily understood that the pipe line e is subjected, during most of the time, to suction, with momentary admissions of air at regular intervals of time, thereby producing, at a great distance from the master pulsator, sharp actions to which a valve may be made to respond. The secondary pulsator valve or claw pulsator, shown in detail in Fig. 3, is especially constructed and adapted to respond to these peculiar pneumatic pulsations and connect each pair of teat cups alternately with the atmosphere and the pipe line (while the latter is connected with suction) and also to connect one pair of teat cups with the atmosphere while the other pair is connected with the pipe line. The specific construction of secondary pulsator shown in Fig. 3 is advantageous, but not essential, the important feature of the invention being the alternating long suction waves and short pressure impulses, whereby the valve is dependably operable at a great distance from the source of pulsations. In its broader and more essential aspect, therefore, my invention is not dependent upon the particular construction of secondary pulsator shown.

In speaking of vacuum or suction, on the one hand, and atmosphere or pressure on the other hand, I mean to include as equivalents any two substantially different absolute pressure conditions.

Having now fully described my invention, what I claim and desire to protect by Letters Patent is:

1. In a milking machine, the combination, with the teat cups, of a pipe line, means to produce in the pipe line pneumatic pulsations comprising relatively long suction waves and relatively short pressure impulses, and means responsive to said pressure impulses to produce pneumatic pulsations in the teat cups.

2. In a milking machine, in combination, teat cups, a pipe line, means to produce in the pipe line for most of the time a pressure normally less than atmospheric, means to cause momentary higher pressure impulses, and means responsive to such impulses to connect the teat cups alternately with the pipe line and the atmosphere.

3. In a milking machine, in combination, teat cups, a pipe line, means to cause therein a pressure normally about half that of atmospheric, means to impress thereon short higher pressure waves, and a valve adapted to respond to such waves, and produce pneumatic pulsations in the teat cups.

4. In a milking machine, in combination, a pipe line, means to exhaust air from said pipe line until the pressure is about half of atmospheric, means to cause higher pressure impulses of relatively short duration in said pipe line, teat cups, a cluster connectible with said teat cups and said pipe line, said cluster having ports and passages, and a valve in the cluster movable in response to said pressure impulses and adapted in its movement to provide communication between said ports and passages so as to connect the teat cups alternately with the atmosphere and the pipe line.

5. In a milking machine, in combination, a source of suction, a pipe connected therewith, a valve adapted to cause higher pressure impulses of relatively short duration in said pipe, teat cups having teat receiving chambers and inflation chambers, a cluster having a milk passage in constant communication with said pipe and said teat chambers and secondary passages in communication with said inflation chambers, and a valve adapted to respond to said high pressure impulses and in its movements connect said secondary passages alternately with the main passage and the atmosphere.

6. In a milking machine, in combination, teat cups, each having a teat receiving chamber and an inflation chamber, a cluster having a main passage in communication with the teat receiving chambers, secondary passages in communication with the inflation chambers, and a movable valve adapted in its movements to connect the secondary passages alternately with the main passage and the atmosphere, a source of suction, a pipe connecting the main passage with the source of suction and a valve adapted, for relatively short time intervals, to disconnect the pipe from the source of suction, connect it with atmosphere and then reconnect it with the source of suction.

7. In a milking machine, the combination with the teat cups having teat chambers and inflation chambers, of a claw comprising a milk passage, a valve chamber and valve, and an air passage, milk pipes connecting the teat chambers of the cups with the milk chamber, air pipes connecting the inflation chambers of the teat cups with the valve chamber, a pipe line, means to produce in the pipe line alternating relatively long suction waves and relatively short pressure impulses, and ports and passages through which said successive pressure impulses are effective to shift the valve to admit air to said inflation chambers and exhaust air therefrom.

8. In a milking machine, the combination with a plurality of teat cups, of a pipe line, means to produce in the pipe line pneumatic pulsations comprising relatively long suction waves and relatively short pressure impulses, and means responsive to one pressure impulse to connect one teat cup with suction and another with atmosphere and responsive to another pressure impulse to connect the first teat cup with atmosphere and the second teat cup with suction.

9. In a milking machine, the combination with a plurality of teat cups, of a reciprocating secondary pulsator adapted on one stroke to connect one teat cup with suction and another with atmosphere and on the return stroke to connect the first teat cup with atmosphere and the second with suction, a pipe line, means to produce in the pipe line alternating relatively long suction waves and relatively short pressure impulses, and ports and passages through which successive pressure impulses are effective to shift the valve in opposite directions.

10. In a milking machine, the combination with the teat cups having teat chambers and inflation chambers, of a claw comprising a milk passage, a valve chamber and valve, and an air passage, milk pipes connecting the teat chambers of the cups with the milk chamber, air pipes connecting the inflation chambers of the teat cups with the valve chamber, a pipe line, means to produce in the pipe line alternating relatively long suction waves and relatively short pressure impulses, and ports and passages through which one pressure impulse is effective to shift the valve in one direction, admit air to one inflation chamber and exhaust air from another, while the next pressure impulse is effective to shift the valve in the reverse direction and exhaust air from the first inflation chamber and admit air to the second inflation chamber.

11. In a milking machine, the combination with teat cups, of a secondary pulsator valve, a pipe line, means to connect the pipe line alternately with suction and pressure, and ports and passages through which air admitted to the pipe line starts the valve to shift, opens one teat cup to atmosphere, exhausts air from the other teat cup and utilizes said exhausted air to aid in shifting the valve.

12. In a milking machine, the combination with teat cups, of a pipe line, a valve cylinder and valve, means to connect the pipe line alternately with suction and pressure, and ports and passages for transmission of air to the valve to start it to shift, to exhaust air from one of the teat cups to aid in said valve shift, to exhaust such air into the pipe line after said pressure impulse is cut off, and to admit air into another teat cup.

13. In a milking machine, the combination with teat cups, of a valve cylinder, a suction pipe line, means to transmit momentary pressure impulses through the pipe line, four ports connecting the valve cylinder and the pipe line, means to prevent the transmission of pressure impulses through two of said ports, a fifth port in the valve cylinder open to atmosphere, pipes connecting the teat cups with the valve cylinder at different points, and a pulsator valve in the valve cylinder having passages adapted to transmit pressure impulses through the said two pressure-transmitting ports respectively to shift the valve in opposite directions, to exhaust air from the teat cup pipes into opposite ends of the valve cylinder and to admit air from the fifth or atmosphere port to the respective teat cup pipes, the ports inactive to transmit pressure impulses operating to exhaust air from opposite ends of the valve cylinder at the completion of a valve stroke.

In testimony of which invention, I have hereunto set my hand, at Poughkeepsie, N. Y., on this 29 day of June, 1922.

JOHN L. HULBERT.